United States Patent
Yoon (10) Patent No.: US 11,252,937 B2
(45) Date of Patent: Feb. 22, 2022

(54) DRYING APPARATUS FOR PET

(71) Applicant: Taesoo Yoon, Siheung-si (KR)

(72) Inventor: Taesoo Yoon, Siheung-si (KR)

( * ) Notice: Subject to any disclaimer, the term of this patent is extended or adjusted under 35 U.S.C. 154(b) by 264 days.

(21) Appl. No.: 16/497,697

(22) PCT Filed: Jul. 21, 2017

(86) PCT No.: PCT/KR2017/007891
§ 371 (c)(1),
(2) Date: Sep. 25, 2019

(87) PCT Pub. No.: WO2018/182099
PCT Pub. Date: Oct. 4, 2018

(65) Prior Publication Data
US 2020/0029530 A1    Jan. 30, 2020

(30) Foreign Application Priority Data

Mar. 27, 2017    (KR) .................. 10-2017-0038617

(51) Int. Cl.
*A01K 13/00*    (2006.01)
(52) U.S. Cl.
CPC .................. *A01K 13/001* (2013.01)
(58) Field of Classification Search
CPC ......... A01K 13/001; A01K 29/00; F26B 3/02; F26B 3/04; F26B 3/06; F26B 3/18; F26B 21/00; A61D 7/00; A61D 11/00
See application file for complete search history.

(56) References Cited

U.S. PATENT DOCUMENTS

| | | | |
|---|---|---|---|
| 3,985,102 A * | 10/1976 | Yonezawa | A01K 13/001 119/416 |
| 2006/0169219 A1* | 8/2006 | Yaghmai | A01K 13/001 119/651 |
| 2017/0099805 A1* | 4/2017 | Arab | A01K 1/035 |

FOREIGN PATENT DOCUMENTS

KR    10-2004-0017500    2/2004
KR    10-1201802    11/2012
(Continued)

OTHER PUBLICATIONS

English Specification of 10-1652203.
(Continued)

*Primary Examiner* — Ebony E Evans
(74) *Attorney, Agent, or Firm* — Quantum Patent Law Firm; Seongyoune Kang (57) ABSTRACT

The present invention relates to a drying apparatus for a pet, which allows a bathed pet to be stably accommodated in an accommodation space part while drying the hair of the pet, thereby quickly and stably drying the hair of the pet. In order to dry the wet hair of a bathed pet, such as a dog or a cat, by evaporating water, the pet is accommodated in an accommodation space part through a door installed in a container portion of a main body; hot air is sucked through a suction pipe which is installed in an upper frame provided in an upper part of the container portion of the main body to generate appropriate heat, and then a vortex of hot air is generated in the accommodation space part through an air intake vortex generation induction pipe communicated with the accommodation space part, thereby quickly and stably drying the hair of the pet accommodated in the accommodation space part with the vortex having appropriate heat; the vortex is discharged to the outside through a discharge pipe; and the water generated in the dried pet is discharged (Continued)

to the outside through a drain hole of a lower supporting frame.

10 Claims, 10 Drawing Sheets

(56) References Cited

FOREIGN PATENT DOCUMENTS

| KR | 10-2014-0040326 | 4/2014 | | |
|---|---|---|---|---|
| KR | 20140040326 A | * 4/2014 | ............ | A01K 13/00 |
| KR | 10-1652203 | 8/2016 | | |
| KR | 10-2016-0128672 | 11/2016 | | |

OTHER PUBLICATIONS

English Specification of 10-2014-0040326
English Specification of 10-2016-0128672.
English Specification of 10-2004-0017500.
English Specification of 10-1201802.

* cited by examiner

DRYING APPARATUS FOR PET

TECHNICAL FIELD

The present disclosure relates to a drying apparatus for a pet. More specifically, in order to dry the hair of a dog or a cat, which is a bathed pet, by evaporating water in the wet state, the pet is accommodated in an accommodation space part through a door installed in a container portion of a main body. Hot air sucked through a suction pipe for generating appropriate heat provided in an upper frame installed on the upper part of the container portion of the main body generates a vortex in the accommodation space part through an air intake vortex generation induction pipe communicated with the accommodation space part, thereby quickly and stably drying the hair of the pet accommodated in the accommodation space part with the vortex having appropriate heat. In addition, the vortex is discharged to the outside through a discharge pipe again, and the water generated in the hair-dried pet is discharged to the outside through a drain hole of a lower supporting frame, such that the pet is stably accommodated in the accommodation space part while drying the hair of the bathed pet. As a result, the present disclosure relates to a drying apparatus for a pet capable of quickly and stably drying the hair of the pet.

BACKGROUND ART

In general, since pet such as a dog or a cat live with people indoors, it is necessary to pay much attention to cleanliness and accordingly, it should be kept cleanliness by often taking a bath to remove the peculiar smells and odors of the pets, and removing germs or mites, dust, and the like included in the hair.

In order to keep cleanliness, the user removes moisture with a towel and then dries by applying hot air by using a device such as a dryer in order to bath and dry the pet including a cat or a dog.

However, as widely known, since the pet often resist while the user wipes the pet with the towel, both the user and the pet is often stressed.

In addition, when the pet shakes the body severely to shake off the moisture on the body in the process in which the user bathes the pet and then dries their hairs, the hairs and water droplets scatter and pollute the surroundings. In addition, since most pet do not stay still and run away or move a lot, there has been a problem that requires a lot of times and efforts to dry the wet hair by using a towel or a dryer.

DISCLOSURE

Technical Problem

In order to solve the above problems, the present disclosure accommodates a pet in an accommodation space part through a door installed in a container portion of a main body, in order to dry the hair of a dog or a cat, which is a bathed pet, by evaporating water in the wet state. In addition, hot air sucked through a suction pipe for generating appropriate heat provided in an upper frame installed on the upper part of the container portion of the main body generates a vortex in the accommodation space part through an air intake vortex generation induction pipe communicated with the accommodation space part, thereby quickly and stably drying the hair of the pet accommodated in the accommodation space part with the vortex having appropriate heat. In addition, the vortex is discharged to the outside through a discharge pipe again, and the water generated in the hair-dried pet is discharged to the outside through a drain hole of a lower supporting frame. In addition, an object of the present disclosure is to provide new a drying apparatus for a pet, which stably accommodates the pet in the accommodation space part while drying the hair of the bathed pet, thereby quickly and stably drying the hair of the pet.

Technical Solution

For achieving the object, the present disclosure includes a plate frame having an outside coupled therein, an upper frame having suction pipes each having a suction fan and a heating member formed to penetrate both sides of an upper part of the plate frame, having an exhaust pipe having an exhaust fan between both of the suction pipes formed to penetrate the upper part of the plate frame, having a lamp pipe having a lamp at both sides of the exhaust pipe formed to penetrate the upper part of the plate frame; an upper cover installed on the upper part of the upper frame to cover the upper part of the upper frame;

a container portion of a main body having the upper frame seated on the upper part thereof and having an accommodation space part in which a pet is accommodated therein, and an air intake vortex generation induction pipe having an inlet hole connected with the suction pipes formed on upper parts of both inside surfaces of the accommodation space part of the container portion of the main body, and having an inclined portion formed on an inside surface of an exhaust hole formed in a lower part thereof and provided so that discharge air, to which suction air received from the suction pipes is discharged through the inclined portion via the inlet hole, generates a vortex inside the accommodation space part communicated with the exhaust hole; and an opening formed at one side of the container portion of the main body, a door installed on the opening to be opened and closed, and a lower supporting frame coupled to the lower part of the container portion of the main body, having a supporting plate having a plurality of through holes installed on an upper part thereof, having a drain hole formed at one side thereof, and having a plurality of moving wheels on a lower part surface thereof.

In addition, the vortex generated in the air intake vortex generation induction pipe is generated inside the accommodation space part through the exhaust hole of the air intake vortex generation induction pipe, and the exhaust hole of the air intake vortex generation induction pipe is communicated with the lower part of the lower supporting frame by penetrating the supporting plate to supply the suction air supplied from the air intake vortex generation induction pipe to the lower part of the lower supporting frame.

In addition, the drying apparatus for the pet includes a communication groove formed at both sides of the supporting plate, and the lower part of the air intake vortex generation induction pipe is inserted into the communication groove to be installed so that the lower part of the air intake vortex generation induction pipe extends to the inside of the lower part of the lower supporting frame.

In addition, the lamp is composed of an LED lamp.

In addition, a plurality of ventilation holes are formed on an upper part of the upper cover.

In addition, a semi-circular groove is formed in plural on the lower part of the lower supporting plate, a semi-circular body having a coupling seating part is provided to be coupled to the semi-circular groove, one side of the semi-circular body is installed to be exposed to the outside of the lower part of the lower supporting frame, and each of the moving wheels is installed on an installation groove formed on the lower part of the semi-circular body.

In addition, the outside surface of the air intake vortex generation induction pipe is formed to be protruded from the outside surface of the container portion of the main body, and the inside surfaces of both of the air intake vortex generation induction pipes are installed to be communicated with the inside surface of the accommodation space part.

In addition, one side of the door is fixedly installed at one side of the opening of the container portion of the main body with a plurality of hinges, a opening and closing handle is installed on the other side surface of the outside of the door, and a transparent window is formed in an opening formed in the door.

In addition, the drying apparatus for the pet includes an insertion hole formed at the outside of the upper part of the air intake vortex generation induction pipe, and a coupling groove formed on the lower part of the air intake vortex generation induction pipe, and the insertion hole is coupled to the inside surface of the upper frame, and the coupling groove is coupled to a protrusion seating part formed to be protruded outwards from the lower supporting frame.

Advantageous Effects

According to the present disclosure, it is possible to accommodate the pet in the accommodation space part through the door installed in the container portion of the main body, in order to dry the hair of a dog or a cat, which is the bathed pet, by evaporating water in the wet state. In addition, it is possible to allow the hot air sucked through the suction pipe for generating appropriate heat provided in the upper frame installed on the upper part of the container portion of the main body generates a vortex in the accommodation space part through the air intake vortex generation induction pipe communicated with the accommodation space part, thereby quickly and stably drying the hair of the pet accommodated in the accommodation space part with the vortex having appropriate heat. It is possible to discharge the vortex to the outside through the discharge pipe again, and discharge the water generated in the hair-dried pet to the outside through the drain hole of the lower supporting frame to stably accommodate the pet in the accommodation space part while drying the hair of the bathed pet, thereby quickly and stably drying the hair of the pet.

BEST MODE

In order to fully understand the present disclosure, preferred embodiments of the present disclosure will be described with reference to the accompanying drawings.

Embodiments of the present disclosure may be modified in various forms, and the scope of the present disclosure should not be construed as being limited to the embodiments described in detail below. This embodiment is provided to more safely explain the present disclosure to those skilled in the art.

Accordingly, the shape of the elements in the drawings, and the like may be exaggerated to emphasize a more clear description. It should be noted that the same members in each drawing have been sometimes shown with the same reference numerals.

Figure 1:
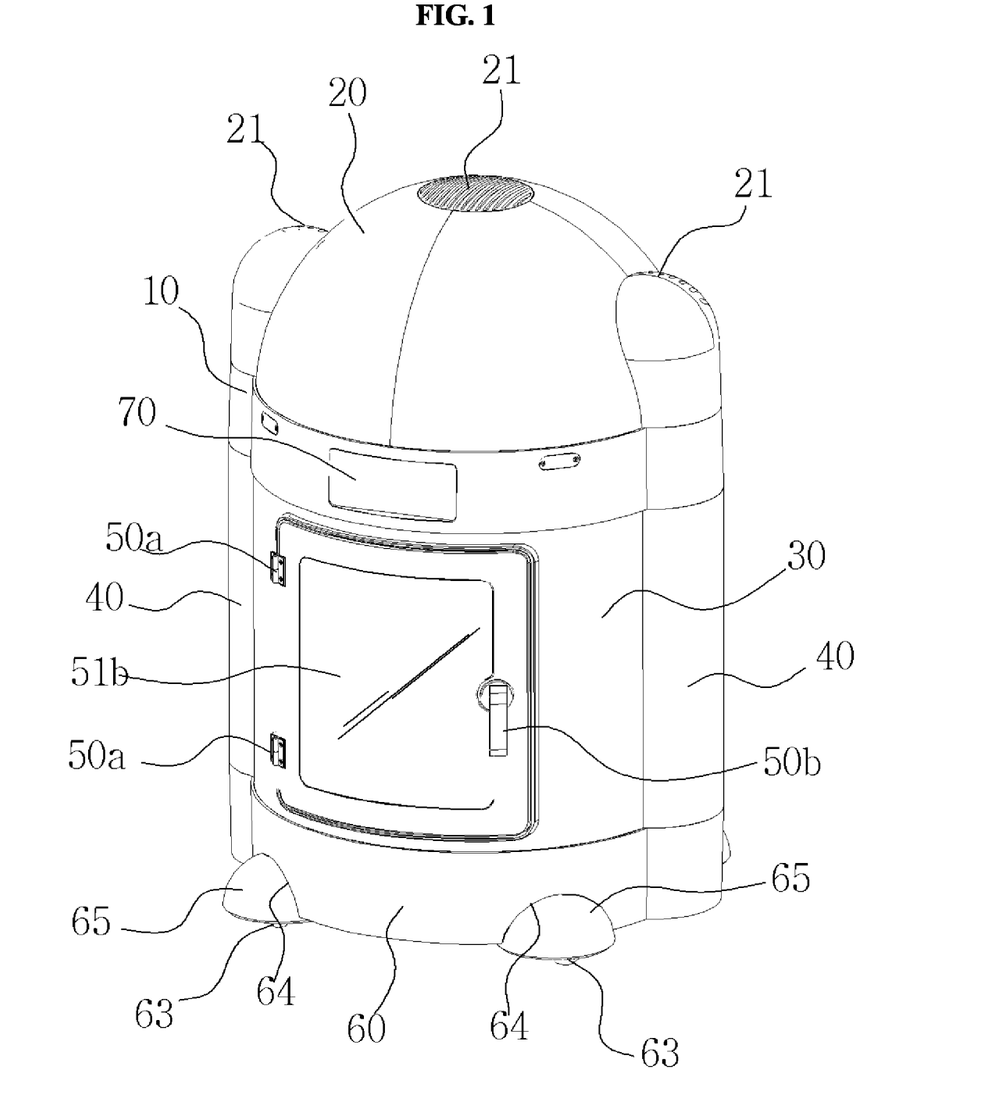
FIG. 1 is a perspective diagram according to the present disclosure.
Figure 2:
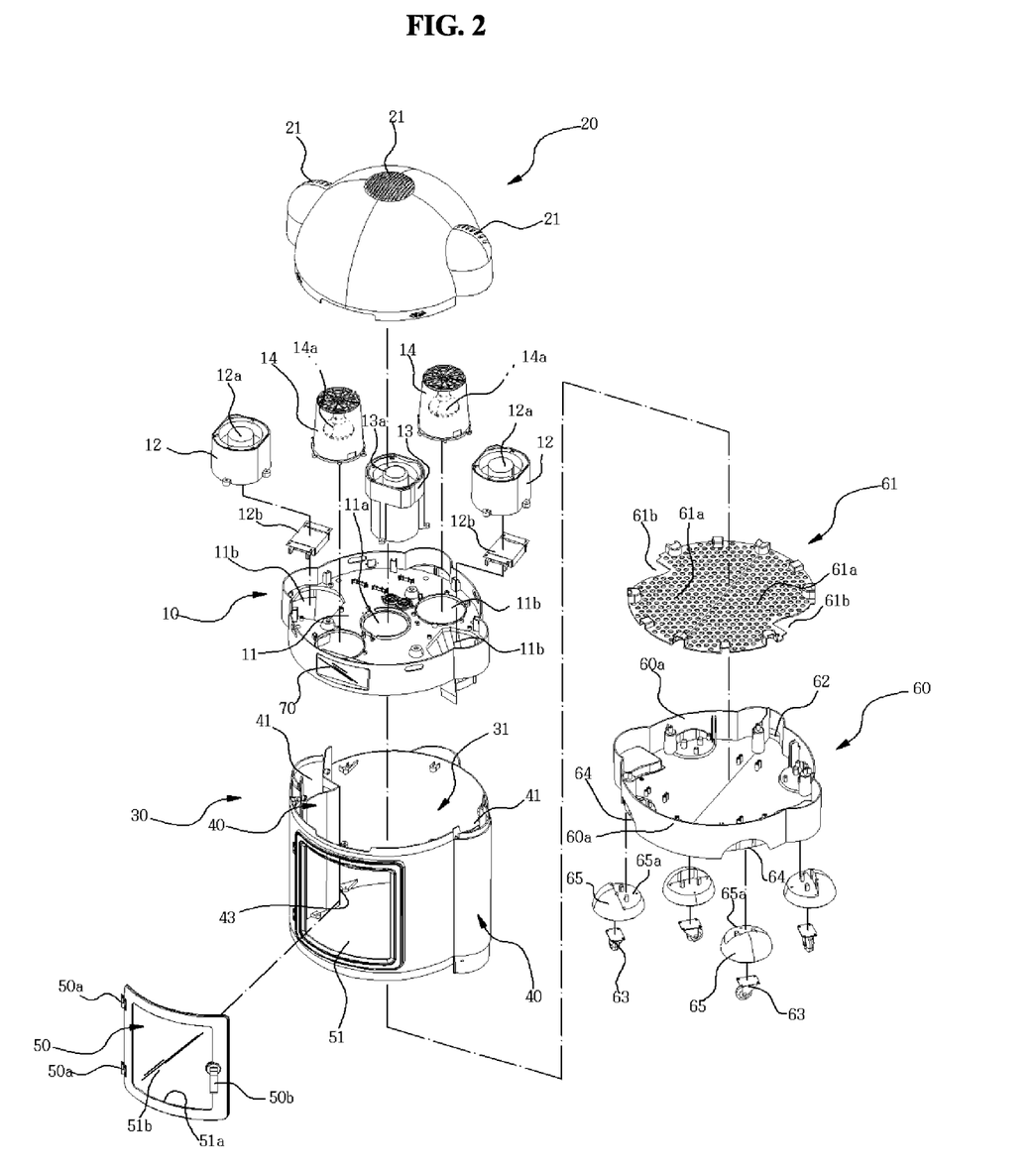
FIG. 2 is an exploded perspective diagram according to the present disclosure.
Figure 3:
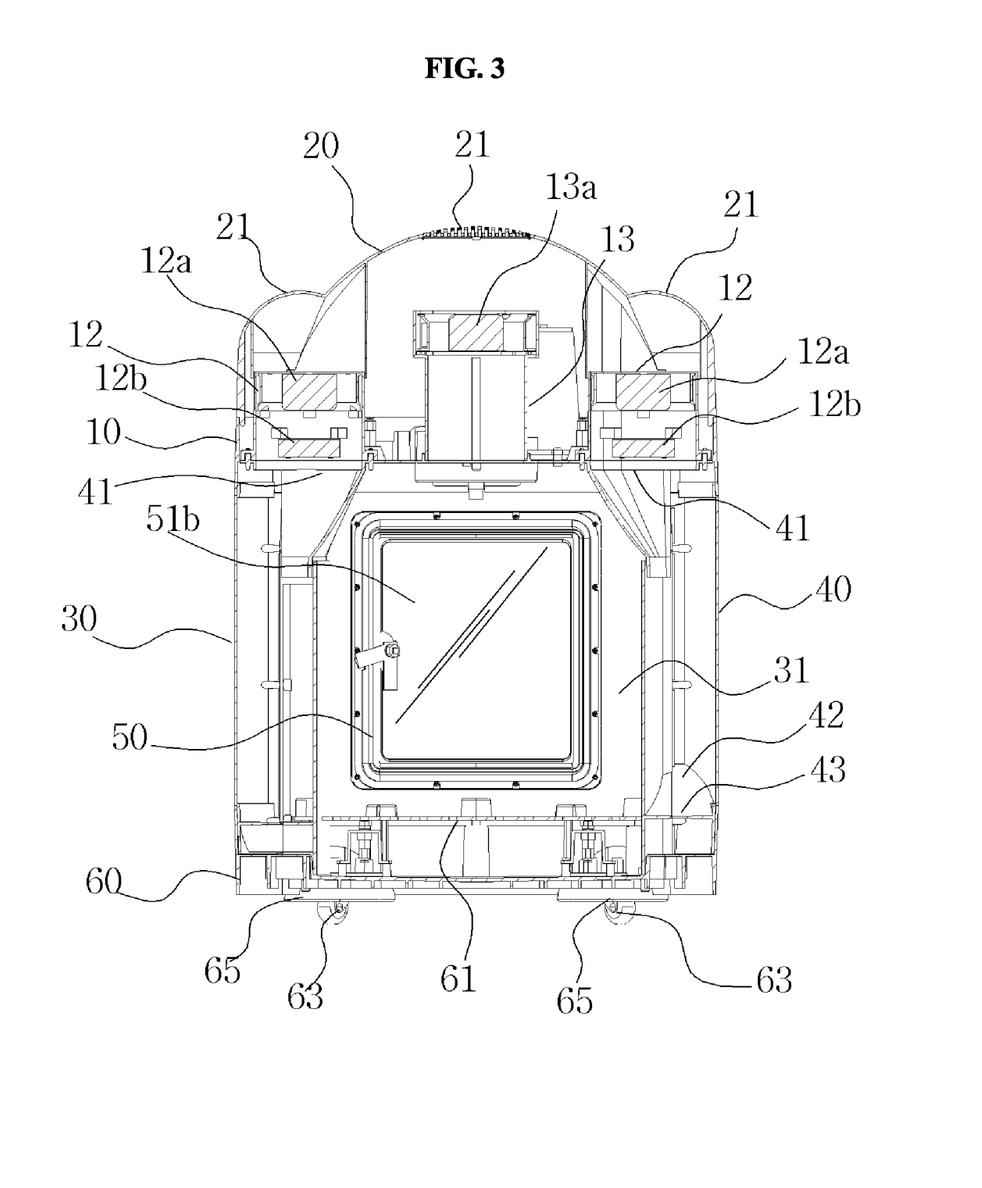
FIG. 3 is a schematic cross-sectional diagram according to the present disclosure.
Figure 4A:
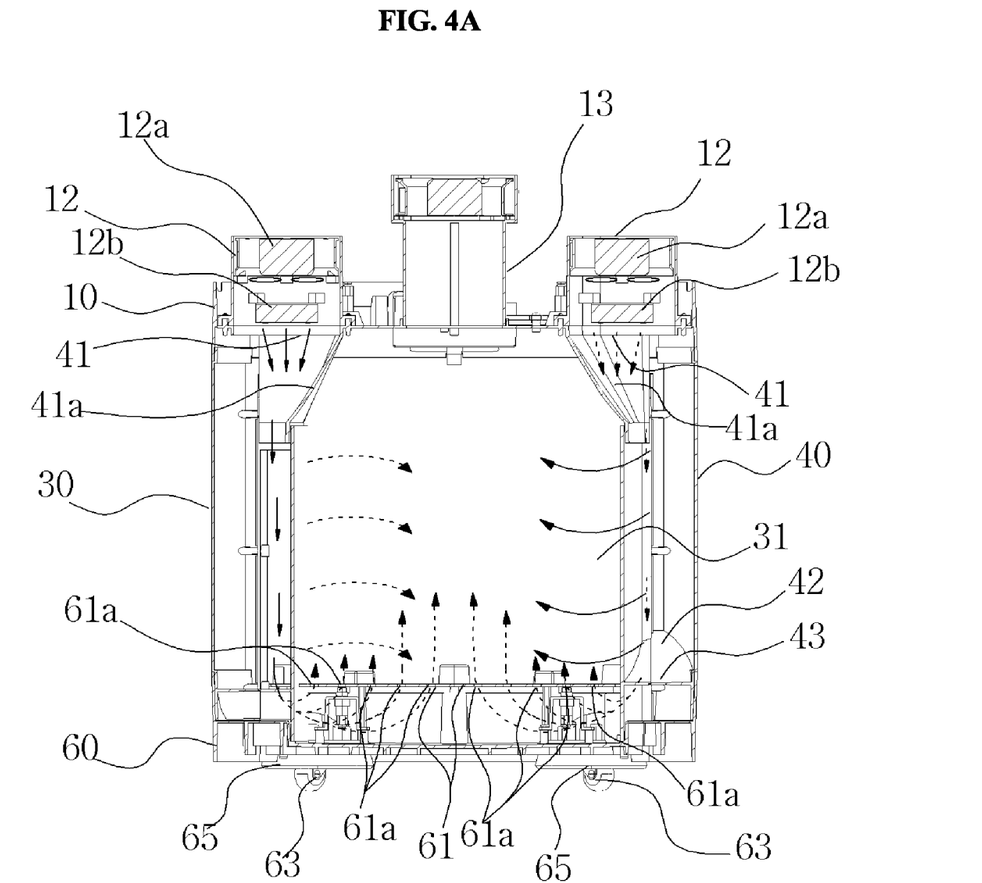
FIG. 4 is a schematic diagram showing an air intake vortex generation induction pipe according to the present disclosure.
Figure 4B:
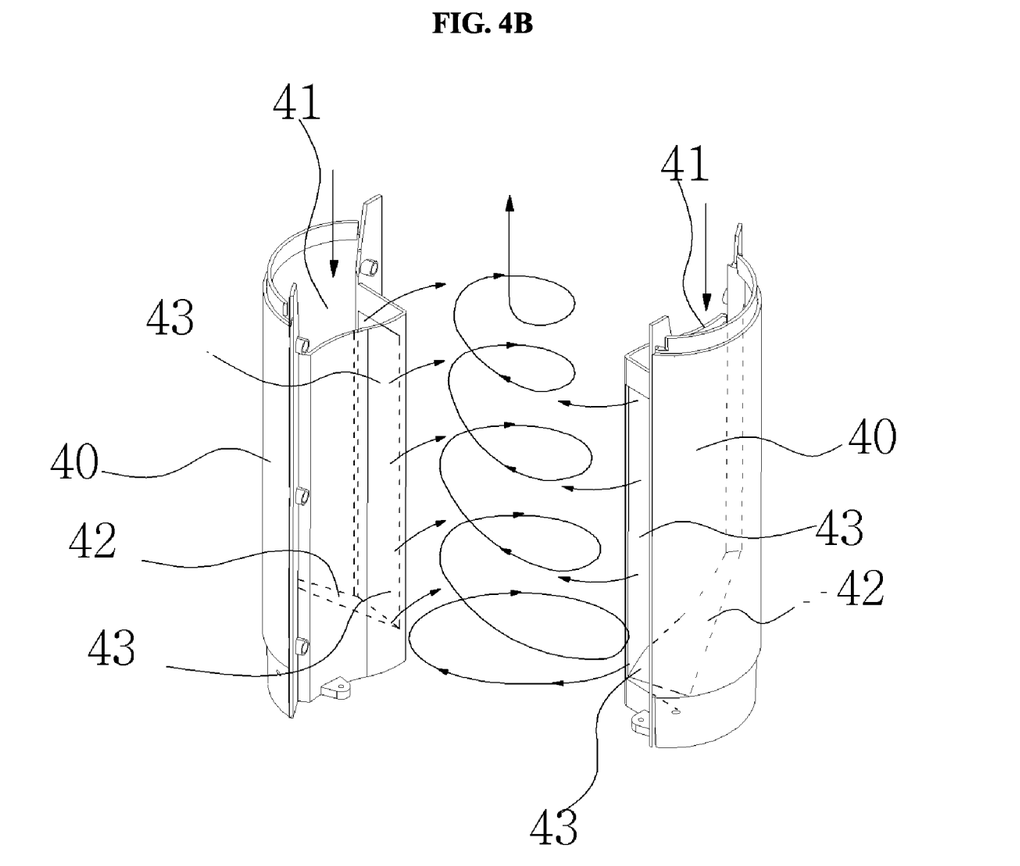
Figure 5:
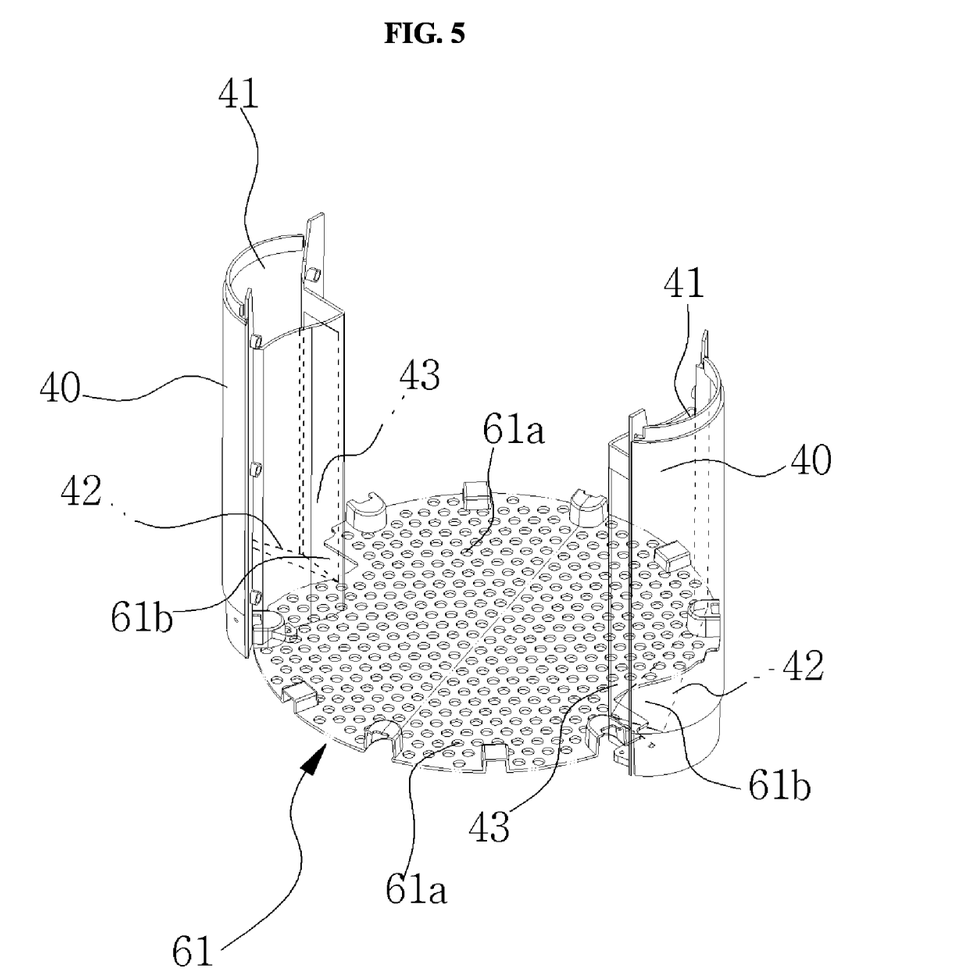
FIG. 5 is a schematic diagram showing a state where an air intake vortex generation induction pipe and a communication groove of a supporting plate have been coupled according to the present disclosure.
Figure 6:
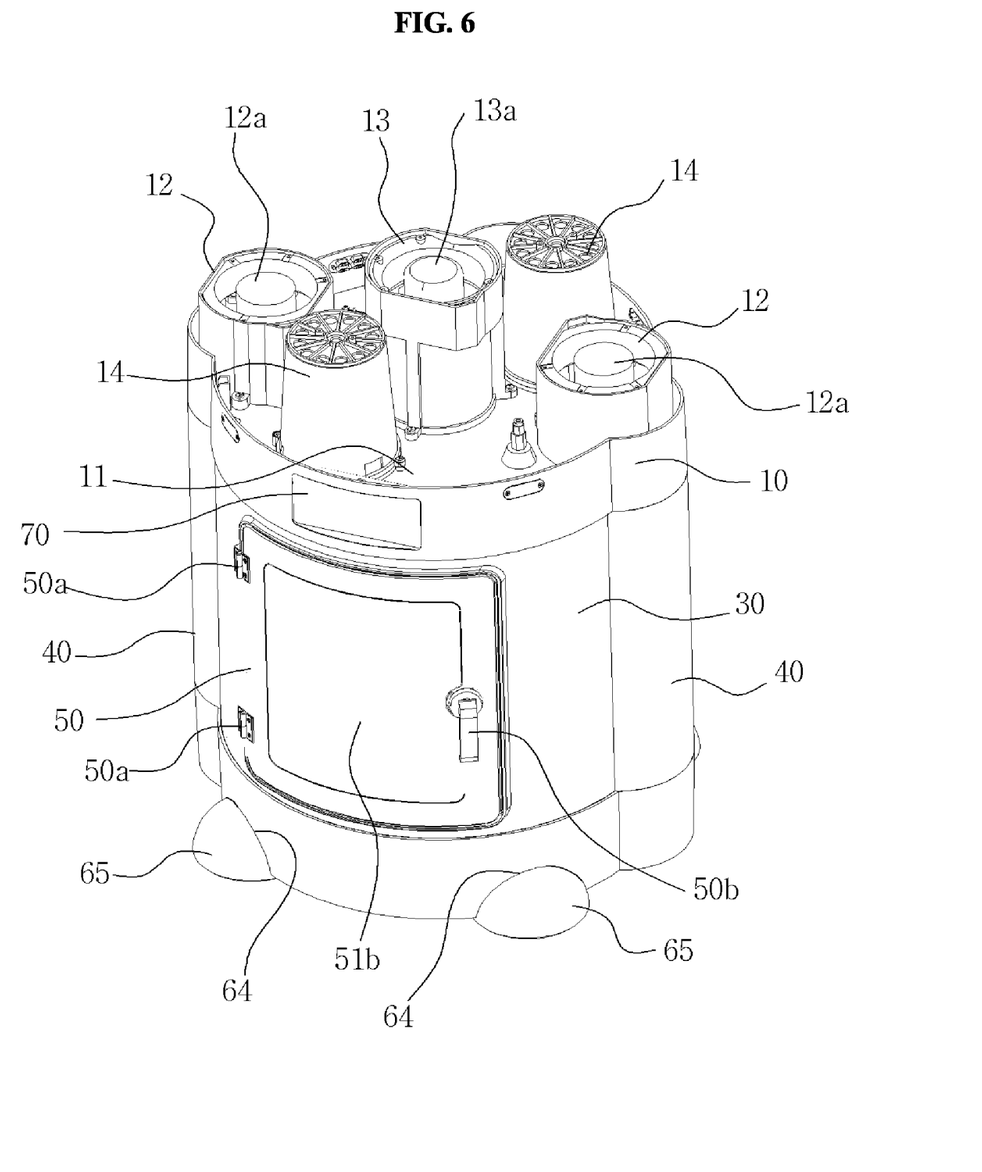
FIG. 6 is a schematic diagram showing the coupling relationship between an upper frame, a lower supporting frame, and an air intake vortex generation induction pipe according to the present disclosure.
Figure 7:
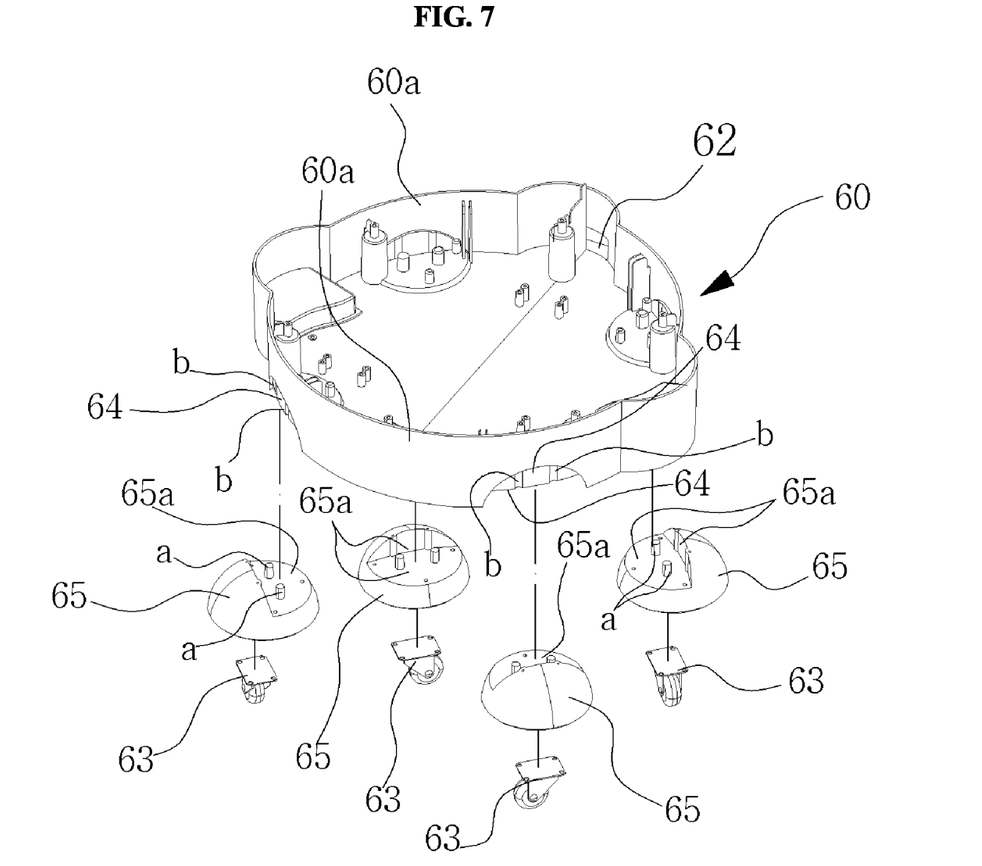
FIG. 7 is a schematic diagram showing a semi-circular body installed on a lower supporting frame according to the present disclosure.
Figure 8:
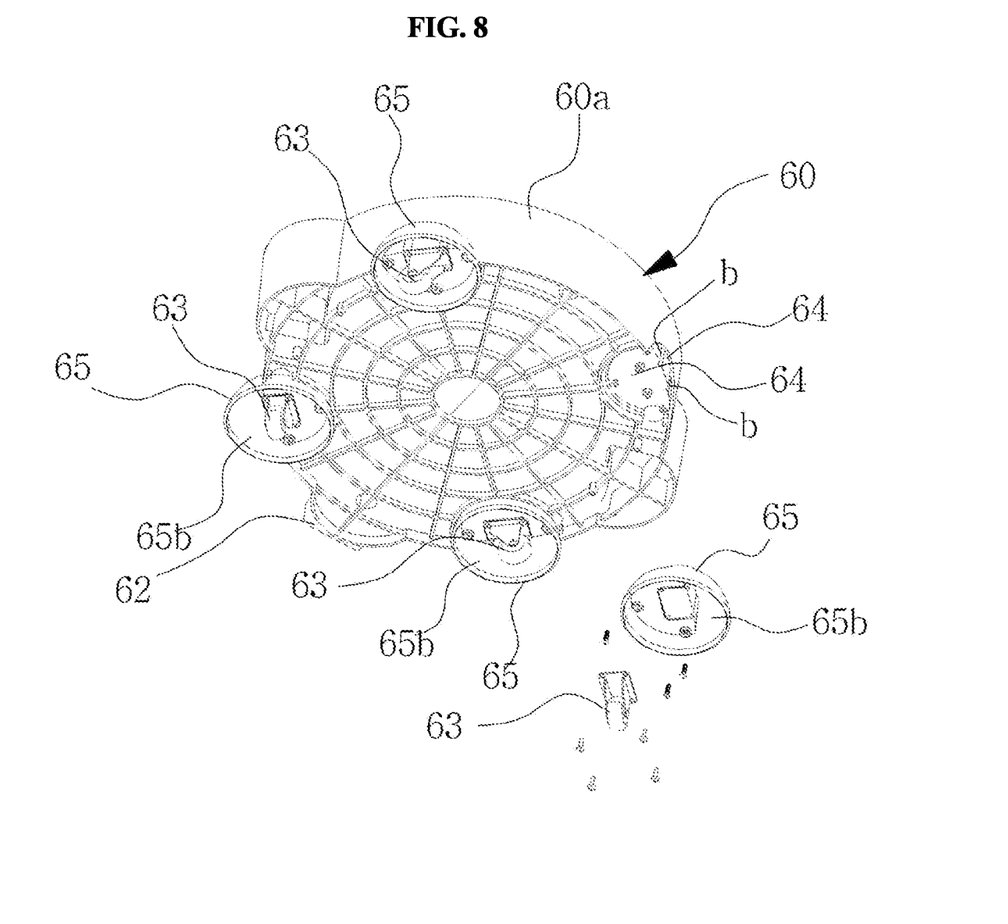
FIG. 8 is a schematic diagram showing an installation groove of the semi-circular body according to the present disclosure.
Figure 9:
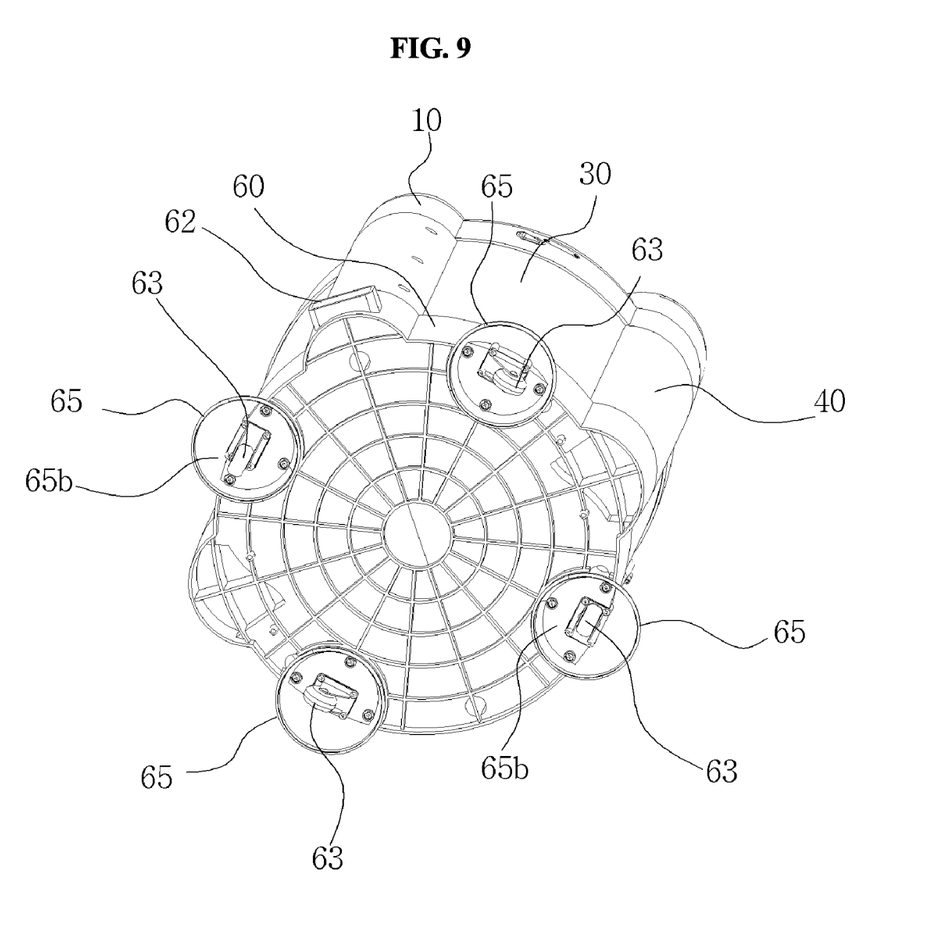
FIG. 9 is a bottom diagram according to the present disclosure.

FIG. 1 is a perspective diagram according to the present disclosure. FIG. 2 is an exploded perspective diagram according to the present disclosure. FIG. 3 is a schematic cross-sectional diagram according to the present disclosure. FIG. 4 is a schematic diagram showing an air intake vortex generation induction pipe according to the present disclosure. FIG. 5 is a schematic diagram showing a state where an air intake vortex generation induction pipe and a communication groove of a supporting plate have been coupled according to the present disclosure. FIG. 6 is a schematic diagram showing the coupling relationship between an upper frame, a lower supporting frame, and an air intake vortex generation induction pipe according to the present disclosure. FIG. 7 is a schematic diagram showing a semi-circular body installed on a lower supporting frame according to the present disclosure. FIG. 8 is a schematic diagram showing an installation groove of the semi-circular body according to the present disclosure. FIG. 9 is a bottom diagram according to the present disclosure.

A drying apparatus for a pet according to the present disclosure will be described in detail with reference to those shown in FIGS. 1 to 9 as follows.

A drying apparatus for a pet according to the present disclosure is composed of an upper frame 10, an upper cover 20, a container portion of a main body 30, an air intake vortex generation induction pipe 40, a door 50, and a lower supporting frame 60.

A plate frame 11 coupled to the outside is configured inside the upper frame 10.

A suction pipe 12 having a suction fan 12a and a heating member 12b is configured to be formed to penetrate both sides of an upper part of the plate frame 11.

An exhaust pipe 13 having an exhaust fan 13a between the suction pipes 12 is configured to be formed to penetrate the upper part of the plate frame 11.

A lamp pipe 14 having lamps 14a at both sides of the exhaust pipe 13 is configured to be formed to penetrate the upper part of the plate frame 11.

The upper frame 10 is configured to be installed by being formed in a circular shape on an upper part of the container portion of the main body 30.

In addition, the plate frame 11, in which the inner circumference of the upper frame 10 is coupled and installed to the outer circumference thereof, is configured.

The plate frame 11 is configured to be formed in a circular shape to be installed on the inner circumference of the upper frame 10 formed in the circular shape.

A central coupling hole 11a is configured to be formed in the center of the plate frame 11, and four coupling holes 11b are formed in the outer circumference of the central coupling hole 11a.

The central coupling hole 11a is configured to be installed with the exhaust pipe 13 provided at the inside of the exhaust fan 13a driven by a motor.

Two coupling holes 11b among the four coupling holes 1ib are configured to be installed with a suction fan 12a driven by the motor, and a suction pipe 12 including a heating member 12b.

In addition, the lamp pipe 14 including the lamp 14a composed of an LED lamp is configured to be installed in the two coupling holes 11b among four the coupling holes 11b.

The suction fan 12a, the heating member 12b, the exhaust fan 13a, and the lamp 14a are configured to be controlled by a microcomputer controller 70.

In particular, the heating member 12b is configured to include a temperature adjuster (not shown) and a timer (not shown) so as to generate a temperature for effectively drying the wet hair of a dog or a cat, which is a pet, at a constant temperature for a certain time.

The temperature adjuster and the timer are configured to be controlled by the microcomputer controller 70.

It is configured to be controlled from the microcomputer controller 70.

In addition, the operating times of the suction fan 12a and the exhaust fan 13a are configured to be controlled by the microcomputer controller 70.

In addition, the ON and OFF of the lamp 14a and the operating time of the lamp 14a are configured to be controlled by the microcomputer controller 70.

The upper cover 20 is configured to be installed on an upper part of the upper frame 10 to cover the upper part of the upper frame 10.

A lower part of the upper cover 20 is configured to be coupled with the upper part of the upper frame 10.

Accordingly, the lower part of the upper cover 20 is formed in a circular shape to be coupled with the upper part formed in a circular shape of the upper frame 10.

In addition, a plurality of ventilation holes 21 are formed in an upper part of the upper cover 20.

It is preferable that the ventilation hole 21 is configured to be installed in three in total by installing one in the upper center of the upper cover 20, and two in the outer circumference thereof.

As described above, the forming the ventilation holes 21 in the upper cover 20 is such that the pet accommodated in the accommodation space part 31 of the container portion of the main body 30 to be described later does not interfere with breathing when the operations of the suction fan 12a of the suction pipe 12 and the exhaust fan 13a of the exhaust pipe 13 are not performed.

In addition, the ventilation hole 21 formed in the upper center of the upper cover 20 is configured to be connection with an upper part of the exhaust pipe 13, the ventilation holes 21 formed in both sides of the upper part of the upper cover 20 are configured to be connected with an upper part of the intake pipe 12.

The container portion of the main body 30 is configured to be formed with the accommodation space part 31 in which the upper frame 10 is seated in and coupled to the upper part thereof, and the pet is accommodated therein.

The container portion of the main body 30 is configured in a state where the upper and lower parts have been opened.

That is, the container portion of the main body 30 is configured to be formed in the cylinder having the upper and lower parts opened.

The accommodation space part 31 formed inside the container portion of the main body 30 is configured so that the supporting plate 61 to be described later is coupled to the lower part of the container portion of the main body 30, and the pet is accommodated inside the accommodation space part 31 through an opening 51 formed in the outer circumference of the container portion of the main body 30.

The opening 51 is configured to be installed with a door 50 to be described later so that the pet may enter and exit.

The air intake vortex generation induction pipe 40 is configured to have an inlet hole 41 formed in the upper part thereof, and to have the exhaust hole 43 formed in a lower part of the air intake vortex generation induction pipe 40.

The inlet hole 41 is configured to be connected with a lower part of a suction induction pipe 41a connected with a lower part of the suction pipe 12.

The suction induction pipe 41a generates a rapid suction air in a funnel shape of a wide upper side and a narrow lower side when the suction air supplied from the suction pipe 12 moves from the upper part to the lower part inside the suction induction pipe 41a to supply it to the inlet hole 41 of the air intake vortex generation induction pipe 40. It is configured to be induced so that a vortex of the rapid flow is generated through the exhaust hole 43 and an inclined portion 42 of the air intake vortex generation induction pipe 40.

The inclined portion 42 is configured to be formed at the inner one side of the exhaust hole 43.

As described above, it is configured in the inlet hole 41 connected with the lower part of the suction pipe 12 installed on both inside surfaces of the accommodation space part 31 of the container portion of the main body 30.

That is, the air intake vortex generation induction pipe 40 is configured to be installed at both inner sides of the accommodation space part 31, and the inlet hole 41 of the air intake vortex generation induction pipe 40 is configured to be connected with the lower part of the suction pipe 12.

The inclined portions 42 are formed on both inside surfaces of the exhaust holes 43 of both of the air intake vortex generation induction pipes 40 so that both of the discharge air, in which the suction air received from both of the suction pipes 12 is discharged through both of the inclined portions 42 via both of the inlet holes 41, is rotated by hitting along the curved surface of the circular shape of an upper part in a lower part inside the accommodation space part 31 communicated with both of the exhaust holes 43. As described above, the vortex (whirlwind) discharge air generated and rotated continuously inside the curved surface of the accommodation space part 31 rises from the lower part inside the accommodation space part 31 to the upper part thereof, such that the discharge air is discharged to the suction pipe 12.

Accordingly, the discharge air rotated from the lower part inside the accommodation space part 31 to the upper part thereof is configured to be provided to generate a vortex from the lower part inside the accommodation space part 31 to the upper part thereof with the suction force of the suction pipe 12 upwards.

It is possible to quickly dry the wet hair of a dog or a cat, which is a pet, accommodated in the accommodation space part 31 with the vortex.

Both of the air intake vortex generation induction pipes 40 generate a continuous vortex upwards along the curved surface by the suction air flowing into the suction pipe 12 hitting the curved surface inside the lower part of the accommodation space part 31 connected with the exhaust hole 43 through the inlet hole 41, the inclined portion 42, and the exhaust hole 43 of the air intake vortex generation induction pipe 40. A vortex, that is, a whirlwind, may be generated inside the accommodation space part 31 to dry the wet hair of a dog or cat, which is a bathed pet, accommodated in the accommodation space part 31 more quickly and effectively.

In addition, the vortex generated in the air intake vortex generation induction pipe 40 is configured to be generated inside the accommodation space part 31 through the exhaust hole 43 of the air intake vortex generation induction pipe 40 and the curved surface, which is the inner wall surface of the accommodation space part.

In addition, the exhaust hole 43 of the air intake vortex generation induction pipe 40 is configured to be communicated with a lower part of the lower supporting frame 60 by penetrating the supporting plate 61 to supply the suction air supplied from the air intake vortex generation induction pipe 40 to the lower part of the lower supporting frame 60.

In addition, a communication groove 61b is configured to be formed at both sides of the supporting plate 61.

A lower part of the air intake vortex generation induction pipe 40 is configured to be inserted into the communication groove 61b so that the lower part of the air intake vortex generation induction pipe 40 is installed to extend to the inside of the lower part of the lower supporting frame 60.

As described above, the exhaust hole 43 of the lower part of the air intake vortex generation induction pipe 40 is configured to be connected to the communication groove 61b formed at both sides of the supporting plate 61 so that the vortex generated in the air intake vortex generation induction pipe 40 rises to a lower part of the supporting plate 61, the lower part of the curved surface inside the accommodation space part 31 of the container portion of the main body 30 to which the exhaust hole 43 has been exposed, and the upper part of the accommodation space part 31 through the through holes 61a formed in the supporting plate 61. It is possible to dry the wet hair of the pet accommodated in the accommodation space part 31 together with the vortex generated in the air intake vortex generation induction pipe 40 at the lower parts of both sides of the accommodation space part 31 more effectively.

Meanwhile, the suction air sucked in the suction pipe 12 of the air intake vortex generation induction pipe 40 passes through the inlet hole 41 and the suction air from the inclined portion 42 again sends the suction air to be inclined downwards, such that the vortex is generated from the lower part to the upper part of the accommodation space part 31 through the exhaust hole 43. The vortex thus generated is configured to be discharged to the outside through the ventilation holes 21 of the upper cover 20 through the exhaust pipe 13 again.

In addition, the outside surface of both of the air intake vortex generation induction pipes 40 are formed to be protruded from the outside surface of the container portion of the main body 30.

The inside surfaces of both of the air intake vortex generation induction pipes 40 are installed to be communicated with the inside surface of the accommodation space part 31.

In addition, an insertion hole 40a is configured to be formed at the outside of an upper part of the air intake vortex generation induction pipe 40.

A coupling groove 40b is configured to be formed in the lower part of the air intake vortex generation induction pipe 40.

The insertion hole 40a is configured to be coupled to the inside surface of the upper frame 10, and the coupling groove 40b is configured to be coupled to a protrusion seating part 66 formed to be protruded outwards on the lower supporting frame 60.

As described above, the insertion hole 40a and the coupling groove 40b are formed the upper and lower parts of the air intake vortex generation induction pipe 40. The insertion hole 40a is coupled to the inside surface of the upper frame 10. The coupling the lower supporting frame 60 to the protrusion seating part 66 by the coupling groove 40b is such that the upper part of the air intake vortex generation induction pipe 40 is stably coupled to and separated from the upper frame 10, and the lower part thereof is stably coupled to and separated from the lower supporting frame 60.

An opening 51 is formed at one side of the container portion of the main body 30, and a door 50 is installed at the opening 51 to be opened and closed.

The door 50 is opened and closed at the opening 51 so that a dog or a cat, which is a bathed pet, is allowed to enter and exit the inside of the accommodation space part 31 through the opening 51.

Meanwhile, one side of the door 50 is configured to be fixedly installed at one side of the opening 51 of the container portion of the main body 30 with a plurality of hinges 50a.

In addition, an opening and closing handle 50b is configured to be installed at the other side surface of the outside of the door 50.

In addition, a transparent window 51b is configured to be formed in an opening 51a formed in the door 50.

The installing the transparent window 51b on the door 50 may be for confirming the state of a dog or a cat, which is a pet, accommodated in the accommodation space part 31 of the container portion of the main body 30 forming the opening 51 in which the door 50 has been installed. This is for inducing psychological stability of the pet by allowing the pet accommodated in the accommodation space part 31 to see a caretaker of the pet through the transparent window 51b.

The lower supporting frame 60 is configured to be coupled to the lower part of the container portion of the main body 30, and to install the supporting plate 61 having a plurality of through holes 61a on an upper part thereof.

The lower supporting frame 60 is configured to be formed in a circular shape, and a partition wall 60a is configured to be formed along the circular shape at its outer circumference. The lower part of the container portion of the main body 30 is configured to be coupled to an upper part of the lower supporting frame 60.

A drain hole 62 is configured to be formed at one side of the lower part of the lower supporting frame 60.

The supporting plate 61 dries the wet hair of the pet with the vortex generated in the air intake vortex generation induction pipe 40 by allowing the bathed pet to stably sit or lie down. Water falling from the hair of the pet in the process of drying the wet hair is configured to be discharged to the outside via the drain hole 62 through the through holes 61a.

Meanwhile, the plurality of the through holes 61a formed in the supporting plate 61 induces the rapid suction air, which has been generated through the suction pipe 12, the suction induction pipe 41a, and the air intake vortex generation induction pipe 40, upwards by hitting the lower part surface of the lower frame 60 through the communication groove 61b formed at both sides of the supporting plate 61. The suction air is supplied to the lower part inside the accommodation space part 31 of the container portion of the main body 30 communicated with the supporting plate 61 through the through holes 61a of the supporting plate 61 seated on the lower frame 60 and a dog or a cat, which is a pet, of the hair-wet state with the bath is accommodated in the accommodation space part 31. The rapid air supplied from the lower part to the upper part of the accommodation space part 31 through the through holes 61a of the supporting plate 61 quickly dries an upper part of the supporting plate 61 and the lower bodies of paws, abdomen, tail, hips, and the like of the pet of a dog or a cat accommodated in the accommodation space part 31.

This is for conveniently and freely moving the lower supporting frame 60 by providing a plurality of moving wheels 63 on the lower part surface of the lower supporting frame 60.

In addition, a semi-circular groove 64 is configured to be formed in plural on the lower part of the lower supporting frame 60.

The semi-circular groove 64 is configured to be formed in a shape of "⌐" on the side surface of the lower supporting frame 63 and the lower part surface of the side surface.

A semi-circular body 65 having a coupling seating part 65a is configured on the upper part to be coupled to the semi-circular groove 64.

The coupling seating part 65a is configured to be formed in a "⌐" shape, and is configured to be coupled to the "⌐" shape of the semi-circular groove 64.

In addition, a plurality of female coupling grooves (a) are configured to be formed on the side surface of the semi-circular groove 64, and a male coupling hole (b) is configured to be formed in plural on an upper part surface of the coupling seating part 65a to be coupled to both of the female coupling grooves (a).

One side of the semi-circular body 65 is installed to be exposed to the outside of the lower part of the lower supporting frame 60.

Each of the moving wheels 63 is configured to be installed in the installation groove 65b formed in a lower part of the semi-circular body 65.

As described above, the semi-circular groove 64, the coupling seating part 65a, and the installation groove 65b are configured in the lower supporting frame 60. This configuration is for coupling and separating the semi-circular body 65 provided with each of the moving wheels 63 to and from the semi-circular groove 64 more easily.

In addition, the semi-circular body 65 is installed to be protruded in plural from the outer circumference of the lower part of the lower supporting frame 60. This installation is for preventing the container portion of the main body 30, which provides the upper frame 10 and the upper cover 20 on the upper part thereof and provides the lower supporting frame 60 on the lower part thereof when the pet has been accommodated in the accommodation space part 31 of the container portion of the main body 30 coupled with the lower supporting plate 60, from falling to left and right and front and rear.

The suction pipe 12, the exhaust pipe 13, and the lamp pipe 14 are fixed to the upper part of the upper frame 10 with a plurality of bolts (not shown). The upper frame 10 is fixed to the upper cover 20 with the plurality of bolts (not shown). The lower part of the upper frame 10 and the upper part of the container portion of the main body 30 are fixed with the plurality of bolts (not shown). The lower part of the container portion of the main body 30 and the upper part of the lower frame 60 are fixed with the plurality of bolts (not shown).

Accordingly, the upper frame 10, the upper cover 20, the container portion of the main body 30, and the lower frame 60 are configured to be assembled by the plurality of bolts (not shown).

The above-described present disclosure accommodates the pet in the accommodation space part 31 through the door 50 installed on the container portion of the main body 30, in order to dry the hair by evaporating water in a state where the hair of a dog or a cat, which is a bathed pet, has been wet in water. Hot air sucked through the suction pipe 12 for generating appropriate heat provided in the upper frame 10 installed on the upper part of the container portion of the main body 30 generates a vortex in the accommodation space part 31 through the air intake vortex generation induction pipe 40 communicated with the accommodation space part 31, thereby quickly and stably drying the hair of the pet accommodated in the accommodation space part 31 with the vortex having appropriate heat. The vortex is discharged to the outside through the discharge pipe 13 again, and the water generated in the hair-dried pet is discharged to the outside through the drain hole 62 of the lower supporting frame 60. Accordingly, this is such that the pet is stably accommodated in the accommodation space part 31 while drying the hair of the bathed pet, thereby quickly and stably drying the hair of the pet.

The embodiments according to the present disclosure described above are merely exemplary, and those skilled in the art in which the present disclosure pertains will appreciate that various modifications and equivalent other embodiments are possible therefrom. Accordingly, it will be well understood that the present disclosure is not limited only to the forms mentioned in the above detailed description.

Accordingly, the true technical protection scope of the present disclosure will be defined by the technical spirit of the appended claims. In addition, it should be understood that the present disclosure includes all modifications, equivalents and substitutions within the spirit of the present disclosure and the scope thereof as defined by the appended claims.

The invention claimed is:

1. A drying apparatus for a pet, comprising:
a plate frame having an outside coupled to an inside of an upper frame, the upper frame having suction pipes each having a suction fan and a heating member formed to penetrate both sides of an upper part of the plate frame, having an exhaust pipe having an exhaust fan between both of the suction pipes formed to penetrate the upper part of the plate frame, having a lamp pipe having a lamp at both sides of the exhaust pipe formed to penetrate the upper part of the plate frame; an upper cover installed on the upper part of the upper frame to cover the upper part of the upper frame;
a container portion of a main body having the upper frame seated on the upper part thereof and having an accommodation space part in which a pet is accommodated therein, and an air intake vortex generation induction pipe having an inlet hole connected with the suction pipes formed on upper parts of both inside surfaces of the accommodation space part of the container portion of the main body, and having an inclined portion formed on an inside surface of an exhaust hole formed in a lower part thereof and provided so that discharge air, to which suction air received from the suction pipe is discharged through the inclined portion via the inlet hole, generates a vortex inside the accommodation space part communicated with the exhaust hole; and an opening formed at one side of the container portion of the main body, a door installed on the opening to be opened and closed, and a lower supporting frame coupled to the lower part of the container portion of the main body, having a supporting plate having a plurality of through holes installed on an upper part thereof, having a drain hole formed at one side thereof, and having a plurality of moving wheels on a lower part surface thereof.

2. The drying apparatus for the pet of claim 1, wherein the vortex generated in the air intake vortex generation induction pipe is generated inside the accommodation space part through the exhaust hole of the air intake vortex generation induction pipe, and the exhaust hole of the air intake vortex generation induction pipe is communicated with the lower part of the lower supporting frame by penetrating the supporting plate to supply the suction air supplied from the air intake vortex generation induction pipe to the lower part of the lower supporting frame.

3. The drying apparatus for the pet of claim 2, further comprising a communication groove formed at both sides of the supporting plate, wherein the lower part of the air intake vortex generation induction pipe is inserted into the communication groove to be installed so that the lower part of the air intake vortex generation induction pipe extends to the inside of the lower part of the lower supporting frame.

4. The drying apparatus for the pet of claim 1, wherein a suction induction pipe in a funnel shape of a wide upper side and a narrow lower side is assembled on the lower part of the suction pipes.

5. The drying apparatus for the pet of claim 1, wherein the lamp is composed of an LED lamp.

6. The drying apparatus for the pet of claim 1, wherein a plurality of ventilation holes are formed on an upper part of the upper cover.

7. The drying apparatus for the pet of claim 1, wherein a semi-circular groove is formed in plural on the lower part of the lower supporting plate, a semi-circular body having a coupling seating part is provided to be coupled to the semi-circular groove, one side of the semi-circular body is installed to be exposed to the outside of the lower part of the lower supporting frame, and each of the moving wheels is installed on an installation groove formed on the lower part of the semi-circular body.

8. The drying apparatus for the pet of claim 1, wherein the outside surface of the air intake vortex generation induction pipe is formed to be protruded from the outside surface of the container portion of the main body, and the inside surfaces of both of the air intake vortex generation induction pipes are installed to be communicated with the inside surface of the accommodation space part.

9. The drying apparatus for the pet of claim 1, wherein one side of the door is fixedly installed at one side of the opening of the container portion of the main body with a plurality of hinges, a opening and closing handle is installed on the other side surface of the outside of the door, and a transparent window is formed in an opening formed in the door.

10. The drying apparatus for the pet of claim 1, further comprising an insertion hole formed at the outside of the upper part of the air intake vortex generation induction pipe, and a coupling groove formed on the lower part of the air intake vortex generation induction pipe, wherein the insertion hole is coupled to the inside surface of the upper frame, and the coupling groove is coupled to a protrusion seating part formed to be protruded outwards from the lower supporting frame.

\* \* \* \* \*